June 18, 1968   E. R. ZIEGLER   3,389,320
WIPER ACTUATING MECHANISM
Filed May 6, 1965   3 Sheets-Sheet 1

INVENTOR.
EUGENE R. ZIEGLER
BY
ATTORNEY

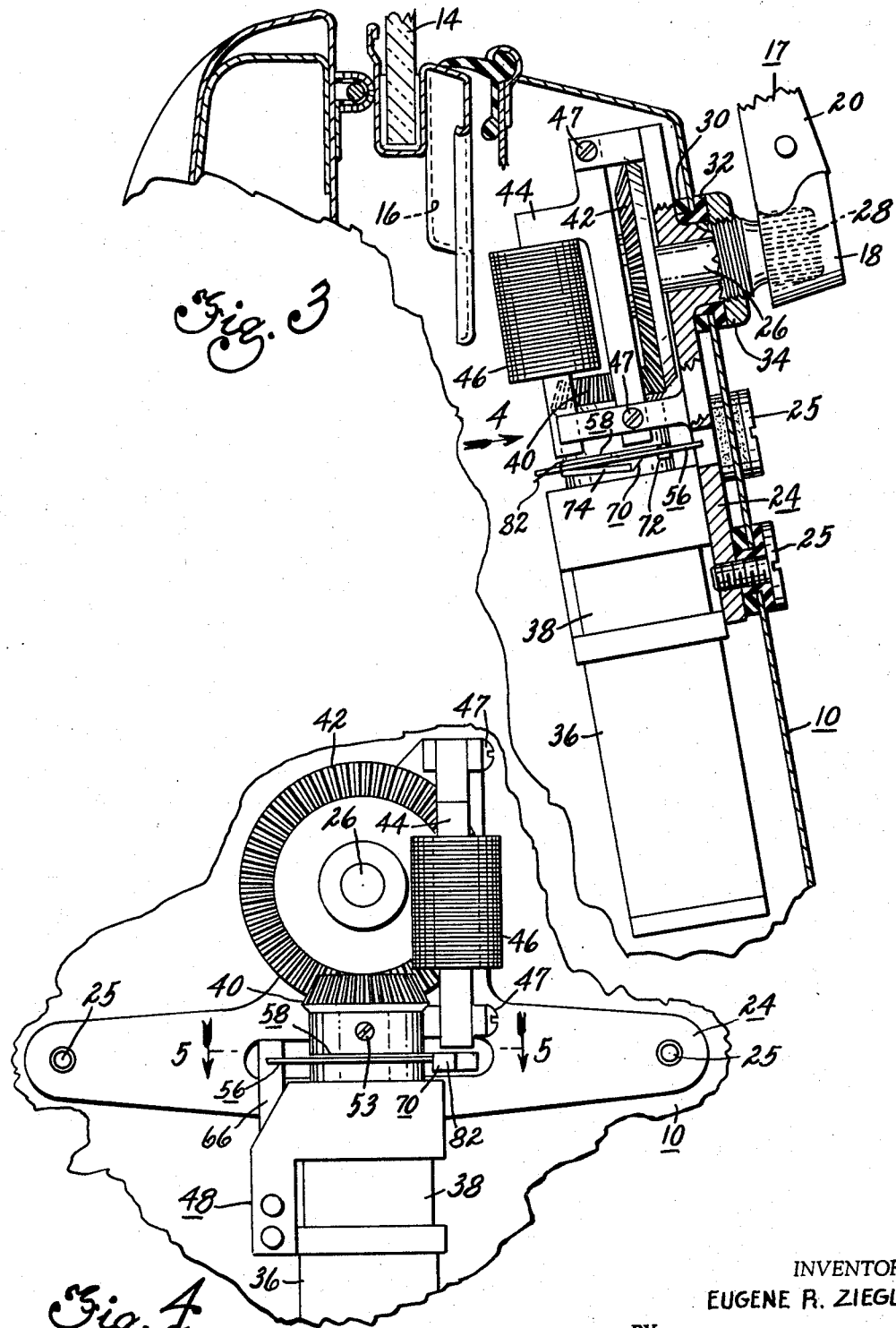

June 18, 1968  E. R. ZIEGLER  3,389,320
WIPER ACTUATING MECHANISM
Filed May 6, 1965  3 Sheets-Sheet 3
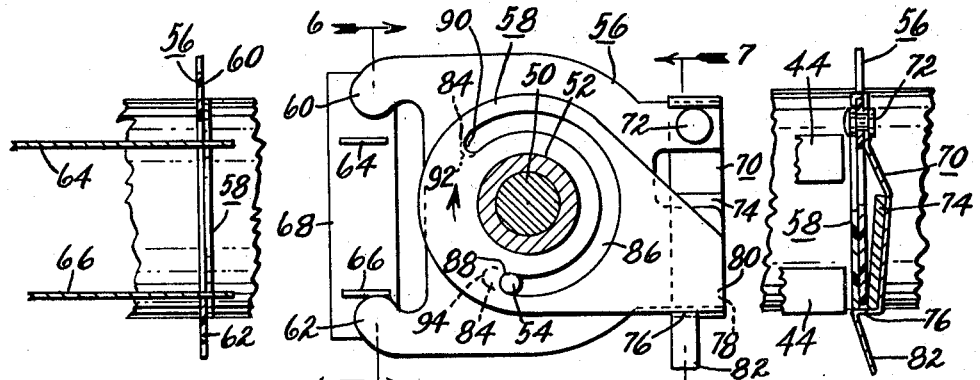
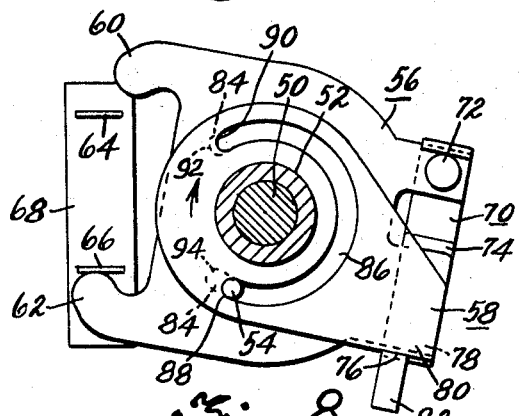
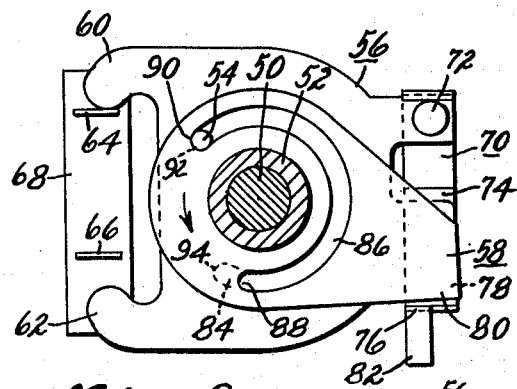
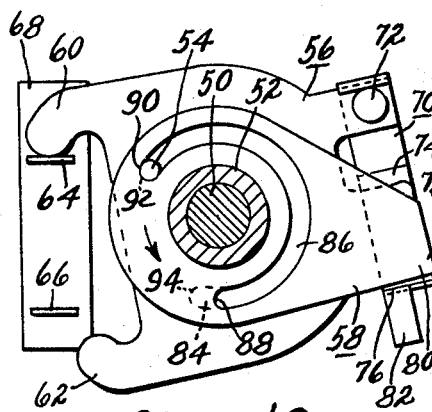
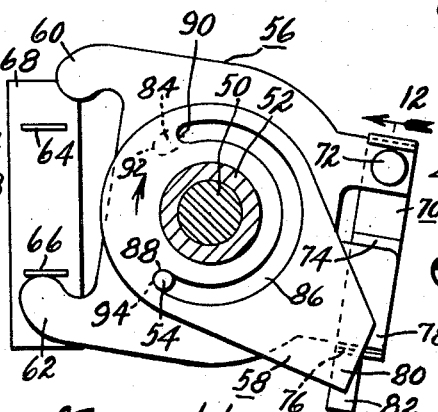
INVENTOR.
EUGENE R. ZIEGLER
BY
ATTORNEY

United States Patent Office 3,389,320
Patented June 18, 1968

3,389,320
WIPER ACTUATING MECHANISM
Eugene R. Ziegler, Spencerport, N.Y., assignor to General Motors Corporation, Detroit, Mich., a corporation of Delaware
Filed May 6, 1965, Ser. No. 453,693
9 Claims. (Cl. 318—443)

This invention pertains to window cleaning mechanism, and particularly to actuating mechanism for oscillating a wiper arm and blade assembly across the outer surface of a rear vehicle window through a running stroke and to a depressed park position.

Heretofore, it has been proposed to clean the rear window of a vehicle with a single oscillatory wiper arm and blade assembly driven by a unidirectional electric motor through an adjustable length linkage so as to move the blade and arm assembly throughout a running stroke and arrest its movement in a depressed park position beyond one end of the running stroke. Such a system is shown in Forbush et al. Patent 3,112,510. The present invention relates to an improved and simplified rear window type wiper system utilizing a reversible motor wherein the motor, gear reduction unit, reversing switch mechanism and the rock shaft constitute a unitized assembly which can be readily attached to the vehicle so as to perform its intended function. Accordingly, among my objects are the provision of window cleaning mechanism for a vehicle comprising unitized means for oscillating a wiper blade and arm assembly through a running stroke and to a depressed park position beyond one end of the running stroke; the further provision of rear window type wiper actuating mechanism for a vehicle comprising a reversible permanent magnet motor having a reversing switch and means for actuating the reversing switch adjacent each stroke end of the wiper arm and blade assembly; and the further provision of a rear window wiper actuating mechanism of the aforesaid type including means for extending the stroke of the wiper arm and blade assembly adjacent one end of its running stroke so as to arrest the wiper in a depressed park position.

The aforementioned and other objects are accomplished in the present invention by embodying a pair of rotatably mounted, slotted cam members and an oscillatory drive pin that coacts with the slotted cam members to actuate the reversing switch adjacent each stroke end of the wiper blade and arm assembly, in combination with electromagnetically operated latch means for controlling the relative positions of the cam members so as to obtain a normal running stroke of the wiper blade and arm assembly when the electromagnet is energized and to extend the stroke of the wiper blade and arm assembly beyond one end of the running stroke when the electromagnet is deenergized.

Further objects and advantages of the present invention will be apparent from the following description, reference being had to the accompanying drawings, wherein a preferred embodiment of the present invention is clearly shown, and wherein similar numerals depict similar parts throughout the several views.

In the drawings:

FIGURE 3 is an enlarged fragmentary sectional view taken along line 3—3 of FIGURE 1.

FIGURE 4 is a fragmentary view, in elevation, taken in the direction of arrow 4 of FIGURE 3.

FIGURE 5 is a fragmentary, sectional view taken along line 5—5 of FIGURE 4.

FIGURES 6 and 7 are fragmentary, sectional views taken along lines 6—6 and 7—7, respectively of FIGURE 5.

FIGURES 8 through 10 are views similar to FIGURE 5 depicting the cam members held in various positions during the running stroke.

FIGURE 11 is a view similar to FIGURE 5 depicting the cam members in their parked position.

FIGURE 12 is a fragmentary sectional view taken along line 12—12 of FIGURE 11.

Figure 1:
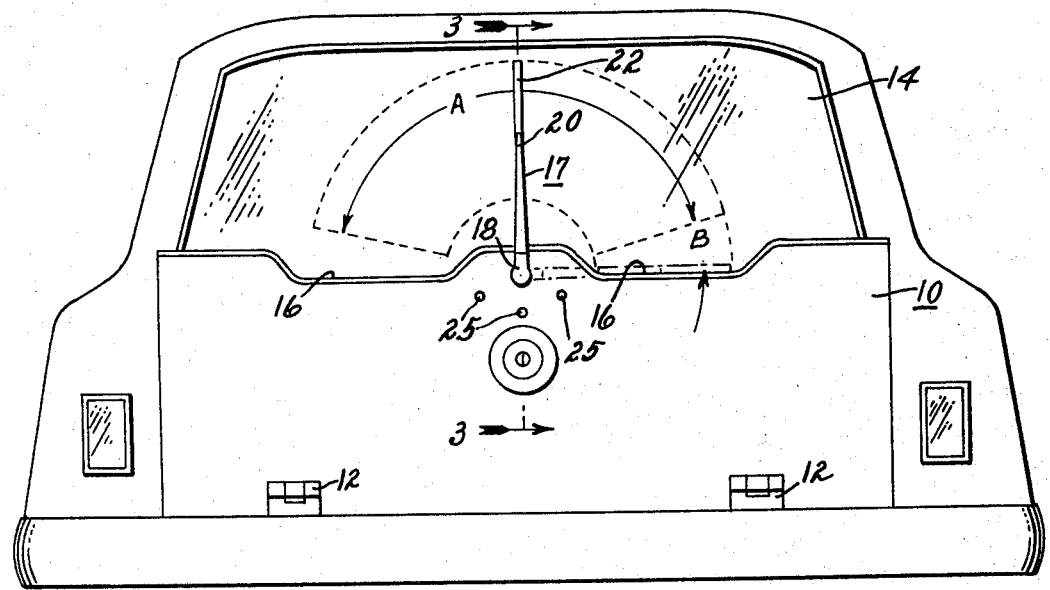
FIGURE 1 is a fragmentary view, in elevation, of a vehicle equipped with the rear window cleaning mechanism of this invention.

With reference to FIGURE 1, a station wagon type vehicle is shown having a tailgate 10 which is connected to the body by spaced hinges 12 such that the tailgate is capable of pivotal movement about a horizontal axis between open and closed positions. The tailgate carries a vertically movable rear window 14 adapted to be cleaned by the wiper mechanism of this invention. In addition, the tailgate 10 is formed with a pair of depressions 16 symmetrically located on opposite sides of the center line thereof. The right hand depression 16 as viewed in FIGURE 1 accommodates the wiper blade when it is moved to its depressed park position as will be pointed out more particularly hereinafter, and in this position the wiper blade is maintained in engagement with the window 14 irrespective of whether the window is raised or lowered. The window cleaning mechanism comprises an oscillatable wiper arm 17 having a mounting section 18 and a blade carrying section 20 interconnected with the mounting section through a spring hinge. The wiper arm 17 carries a wiper blade 22 which is movable throughout a running stroke depicted by the angle A and to a depressed park position throughout the angle B beyond one end of the running stroke.

Referring to FIGURES 3 and 4, the unitized cleaner assembly constructed according to the present invention comprises a bracket 24 disposed between the inner and outer panels of the tailgate 10 and attached thereto by mounting bolts 25. The bracket 24 constitutes a bearing support for a rock shaft 26 which extends through the tailgate 10, the rock shaft 26 having a knurled driver 28 to which the mounting section of the wiper arm is connected. A washer 30 is interposed between the bracket 24 and the inner surface of the outer tailgate panel, and an elastomeric sealing washer 32 and an escutcheon plate 34 conceal and seal the opening through the outer tailgate panel. It is noted that the wiper arm and blade assembly is mounted substantially centrally of the tailgate as shown in FIGURE 1.

The bracket 24 carries a unitized actuating mechanism which comprises a miniature direct current, permanent magnet motor 36 having an integral gear reduction unit 38 which is connected to a shaft having an output bevel gear 40. The gear meshes with a bevel gear 42, which gears form the final stage of gear reduction, the bevel gear 42 being attached to the rock shaft 26. An electromagnet, comprising a yoke 44 and a coil 46, is supported by screws 47 on inwardly extending arms integral with the bracket 24. In addition, a reversing switch mechanism 48 is suitably attached to the housing of the gear reduction unit 38 as seen in FIGURE 4.

Referring to FIGURES 4 through 12, the gear reduction unit 38 includes an output shaft 50 journalled in a sleeve bearing 52. The output shaft 50 is connected to the hub of the bevel gear 40 by means of a set screw 53, and the hub of the bevel gear 40 has an axially extending pin 54 attached thereto. A switch actuating cam member 56 of insulating material is journalled on the outer periphery of the sleeve bearing 52, and a second cam member 58 of insulating material is also journalled on the periphery of the sleeve bearing 52, the cam members 56 and 58 being superposed as shown in FIGURE 6 and disposed between the hub of gear 40 and the housing of the gear reduction unit 38. The cam member 56 includes a pair of laterally extending integral arms 60 and 62, the arm 60 being adapted to engage a reversing switch actuator 64, and the arm 62 being adapted to engage a reversing switch actuator 66, the two reversing switch actuators 64 and 66 being connected by a plate 68, the position of which controls a triple pole, double throw snap acting reversing switch of conventional construction. The cam plate 56 has a resilient spring latch 70 attached thereto by a rivet 72. The spring latch 70 is inherently biased away from the cam member 58, and carries an armature 74 of magnetic material. The latch 70 is formed with an abutment, or shoulder, 76 adapted to coact with the ends 78 and 80 of the cam members 56 and 58, respectively, and a laterally offset ramp portion 82, the purpose of which will be described hereinafter. The ends of the yoke 44 of the electromagnet attract the armature 74 when the coil 46 is energized so as to maintain the latch 76 in the position shown in FIGURES 5 through 10, and thus substantially prevent relative movement between the cam member 58 and the cam member 56 in the clockwise direction as viewed in FIGURES 5 through 10.

The cam member 56 is formed with an elongate arcuate slot 84 concentric with the shaft 50, and the cam member 58 is formed with an elongate arcuate slot 86 of lesser angular extent from the slot 84, and likewise concentric with the shaft 50, as well as being aligned with the slot 84 in the cam member 56. The pin 54, which is driven with the bevel gear 40, extends through both slots 84 and 86 and is capable of imparting movement through cam 58 to the cam member 56 so as to actuate the reversing switch adjacent the stroke ends of a normal running stroke of the wiper blade and arm assembly.

Accordingly, referring to FIGURES 1 and 5 through 8, as the wiper blade and arm assembly moves in the clockwise direction the pin 54 will rotate in the clockwise direction within the aligned slots 84 and 86. As the wiper arm and blade assembly approaches its stroke end position, the pin 54 approaches the lower end 88 of the slot 86 such that when the pin abuts the end 88 of the slot 86 it will impart pivotal movement to the cam member 58. Since the end 80 of the cam member 58 is held by the latch 76, the cam member 58 will impart clockwise movement through the latch 76 to the cam member 56 from its position in FIGURE 5 to the position of FIGURE 8. In this position the switch actuating arm 62 of the cam member 56 engages the actuator 66 so as to reverse the position of the reversing switch 48. Accordingly, the direction of the motor will be reversed and the pin 54 will then rotate in the counterclockwise direction as viewed in FIGURE 8. As the wiper arm and blade assembly approaches its other stroke end position in the counterclockwise direction as viewed in FIGURES 1 and 9, the pin 54 will approach the upper end 90 of slot 86 so as to impart counterclockwise movement to the cam member 58 so as to align the upper end 90 of the slot 86 with the upper end 92 of the slot 84 in the cam member 56. When the pin 54 engages the end 92 in the slot 84 of the cam member 56, the cam member 56 as well as the cam member 58 will be rotated in the counterclockwise direction from the position of FIGURE 9 to the position of FIGURE 10 so that the end 60 of the cam member 56 will engage the switch actuator 64 and again reverse the position of the reversing switch 48. Accordingly, the motor will again reverse its direction so as to move the wiper blade and arm assembly in the clockwise direction as viewed in FIGURE 1. Thus, it is apparent that the motor 36 reverses its direction at each stroke end of the normal running stroke so as to move the wiper blade and arm assembly throughout the running stroke A as shown in FIGURE 1.

Figure 2:
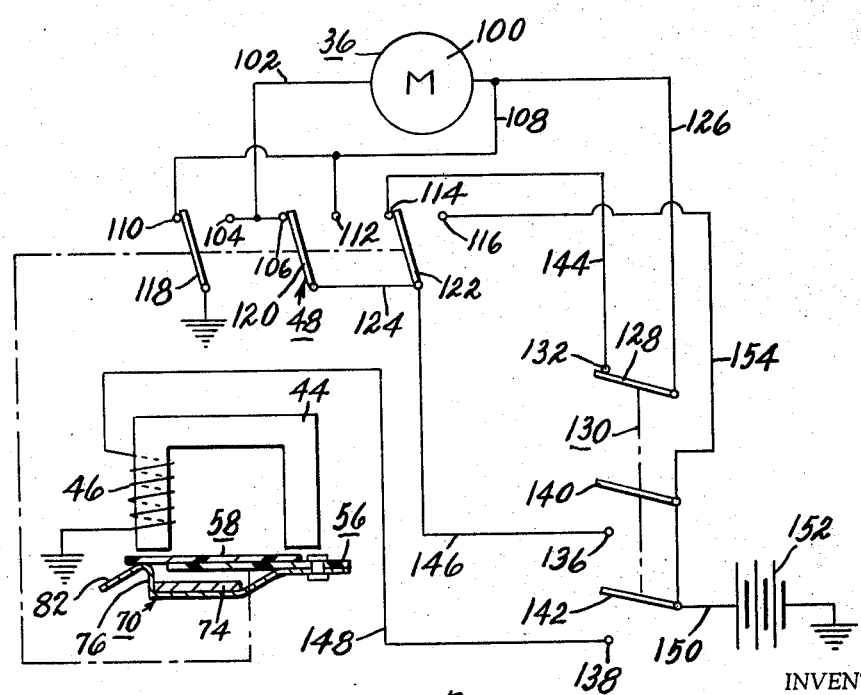
FIGURE 2 is an electrical schematic of the energizing circuit for the wiper mechanism.

Referring to FIGURE 2, the permanent magnet reversible direction current motor 36 includes a conventional wound armature 100 which is connected by a wire 102 with a pair of stationary switch contacts 104 and 106 of the reversing switch 48, and is connected by a second wire 108 to a second pair of stationary contacts 110 and 112 of the reversing switch. The reversing switch 48 includes a third set of stationary contacts 114 and 116, and three movable switch contacts 118, 120 and 122 which are gang connected. In addition, movable switch contacts 120 and 122 are electrically interconnected by wire 124. The armature of the motor is also connected by wire 126 to a movable contact 128 of the manually operable triple pole switch 130. The manual switch 130 includes stationary contacts 132, 136 and 138, and movable contacts 128, 140 and 142 which are gang connected. Contact 132 of the manual switch is connected by wire 144 to stationary contact 114 of the reversing switch 48. Contact 136 is connected by a wire 146 with the wire 124 and hence movable contacts 120 and 122 of the reversing switch. Stationary contact 138 is connected by wire 148 to the coil 46 of the electromagnet. Movable contacts 140 and 142 of the manual switch are connected by wire 150 to one terminal of a battery 152, the other terminal of which is connected to ground. The movable contacts 140 and 142 are connected by wire 154 to the stationary switch contact 116 of the reversing switch.

The manual control switch 130 is shown in the "off" position in FIGURE 2, and when it is moved to the "on" position, movable contact 140 engages stationary contact 136 and movable contact 142 engages stationary contact 138, while movable contact 128 is disengaged from stationary contact 132. Accordingly, the electromagnet will be energized from the battery 152 through contacts 142 and 138 and wire 148. In addition, movable contacts 120 and 122 of the reversing switch will be energized from the battery through contacts 140 and 136 and wires 146 and 124. With the reversing switch in the position shown in FIGURE 1, current will be applied to the armature 100 from the battery through switch contacts 120 and 106 of the reversing switch through wire 102 and back to ground through wire 108 and switch contacts 110 and 118. When the position of the switch 48 is reversed, current will flow in the opposite direction through the armature 100 from the battery through switch contacts 120 and 112 through wire 108 and back to ground through wire 102 and switch contacts 104 and 118. Thus, as the reversing switch is moved between its two positions by the cam member 56, the wiper blade and arm assembly will be oscillated throughout its running stroke A across the window 14.

When the manual switch 130 is moved to the position shown in FIGURE 2, movable contacts 120 and 122 of the reversing switch are deenergized. However, stationary contact 116 is energized through wire 154 and the movable switch contact 128 completes a circuit between wire 126, stationary contact 132, wire 144 and stationary contact 114. Accordingly, when the reversing switch is in the position where movable contact 122 engages stationary contact 116 the motor will be energized from the battery through wire 154, contacts 116 and 122, wire 124, contacts 120 and 112, wire 108 through the armature 100 and wire 102 through contacts 104 and 118 to ground. However, as soon as the reversing switch 48 is moved to the position of FIGURE 1, the armature 100 will be deenergized and will concurrently be short-circuited through wire 102, contacts 106 and 120, wire 124, contacts 122 and 114, wire 144, contacts 132 and 128 and wire 126 to establish a dynamic braking circuit for the motor to abruptly arrest its movement. It is to be understood that the dynamic braking circuit will operate to arrest armature movement since the motor includes a permanent magnet field, and hence continued rotation of the short-circuited armature will set up a bucking magnetic field to substantially instantaneously arrest armature rotation due to current induced in the armature winding.

Referring to FIGURES 11 and 12, depressed parking is achieved by the wiper actuating mechanism of the present invention by releasing the latch 76 from the ends 78 and 80 of the cam members 56 and 58, when the electromagnet 46, 44 is deenergized. Thus, when the electromagnet is deenergized the inherent spring bias of the latch arm 70 will move the abutment 76 to the position of FIGURE 12 so that the pin 54 can pivot the cam member 56 relative to the cam member 58 in the clockwise direction so as to align ends 94 and 88 of the slots 84 and 86 before movement will be imparted to the cam member 56 so as to actuate the reversing switch 48. The increased angular movement which must be imparted to the cam member 58 to actuate the reversing switch 48 is sufficient to move the wiper arm and blade assembly throughout the angle B beyond the end of its normal running stroke A and to the depressed park position shown in dotted lines in FIGURE 1, whereat the motor will be arrested by dynamic braking as alluded to hereinbefore.

Upon closure of the manual switch 130 to operate the wiper mechanism the coil 46 of the electromagnet will be energized, but since the ends 78 and 80 of the cam members 56 and 58, respectively, are out of alignment, the latch arm 70 cannot move to its latched position. However, the ramp 82 will engage the edge 80 of the cam 58 thereby assuring that the cam plate 58 will not strike the abutment 76 during counterclockwise movement thereof. When the cam members 56 and 58 approach the position shown in FIGURE 5, the abutment 76 will re-engage with the edge 80 of the cam member 58 so as to assure actuation of the reversing switch adjacent the normal running stroke end of the wiper arm and blade assembly.

While the embodiment of the invention as herein disclosed constitutes a preferred form, it is to be understood that other forms might be adopted.

What is claimed is as follows:

1. Wiper actuating mechanism comprising, a reversible, direct current rotary electric motor, an oscillatory rock shaft, a gear reduction unit interconnecting said rotary motor and said rock shaft, a reversing switch controlling the direction of rotation of said motor and the direction of oscillation of said rock shaft, reversing switch actuating means operable adjacent each end of a running stroke of said rock shaft for reversing the direction of rotation of said motor comprising a pair of superposed, rotatable cam members having aligned, elongate arcuate slots and means driven by said gear reduction unit and extending into said slots for effecting conjoint angular movement of said cam members adjacent each stroke end of the running stroke for actuating said reversing switch, and means operable to permit relative angular movement between said cam members adjacent one stroke end of said running stroke so as to enable said motor to impart movement to said rock shaft beyond one end of the running stroke to a depressed park position prior to actuating said reversing switch to arrest rotation of said motor.

2. Wiper actuating mechanism comprising, a reversible direct current rotary electric motor, an oscillatory rock shaft, a gear reduction unit interconnecting said rotary motor and said rock shaft, a reversing switch controlling the direction of rotation of said motor and the direction of oscillation of said rock shaft, reversing switch actuating means operable adjacent each end of a running stroke of said rock shaft for reversing the direction of rotation of said motor comprising a pair of superposed, rotatable cam members having aligned, elongate arcuate slots of unequal angular extent, latch means interconnecting said cam members to obtain conjoint angular movement of said cam members in one direction, and means driven by said gear reduction unit and extending into said slots for effecting conjoint angular movement of said cam members in opposite directions at each stroke end of the running stroke for actuating said reversing switch, and means operable to relase said latch means to permit relative angular movement between said cam members in said one direction adjacent one stroke end of said running stroke so as to enable said motor to impart movement to said rock shaft beyond one end of said running stroke to a depressed park position prior to actuating said reversing switch to arrest rotation of said motor.

3. Unitized wiper actuating mechanism comprising, a bracket, a reversible, direct current rotary electric motor carried by said bracket, an oscillatory rock shaft journalled in said bracket, a gear reduction unit interconnecting said rotary motor and said rock shaft, a reversing switch carried by said motor and controlling the direction of rotation of said motor and the direction of oscillation of said rock shaft, reversing switch actuating means carried by said gear reduction unit and operable adjacent each end of a running stroke of said rock shaft for reversing the direction of rotation of said motor comprising, a pair of superposed, rotatable cam members having aligned, elongate arcuate slots and a pin driven by said gear reduction unit and extending into said slots for effecting conjoint angular movement of said cam members adjacent each stroke end of the running stroke for actuating said reversing switch, and means operable to permit relative angular movement between said cam members adjacent one stroke end so as to enable said motor to impart movement to said rock shaft beyond one end of the running stroke to a depressed park position prior to actuating said reversing switch to arrest rotation of said motor.

4. Unitized wiper actuating mechanism comprising, a bracket, a reversible, direct current rotary electric motor carried by said bracket, an oscillatory rock shaft journalled in said bracket, a gear reduction unit interconnecting said rotary motor and said rock shaft, a reversing switch carried by said motor and controlling the direction of rotation of said motor and the direction of oscillation of said rock shaft, reversing switch actuating mechanism carried by said gear reduction unit and operable adjacent each end of a running stroke of said rock shaft for reversing the direction of rotation of said motor comprising, a first rotatable cam member having an elongate arcuate slot, a second rotatable cam member superposed on said first cam member and having an elongate arcuate slot of lesser angular extent than the slot in said first cam member and aligned therewith, latch means interconnecting said cam members to obtain conjoint angular movement of said cam members in one direction and a drive pin driven by said gear reduction unit and extending into said slots for effecting conjoint angular movement of said cam members adjacent each stroke end of the running stroke for actuating said reversing switch, and means operable to release said latch means to permit relative angular movement between said cam members in said one direction so as to enable said motor to impart movement to said rock shaft beyond one end of the running stroke to a depressed park position prior to actuating said reversing switch to arrest rotation of said motor.

5. Unitized wiper actuating mechanism comprising, a bracket, a reversible, direct current rotary electric motor attached to said bracket, an oscillatory rock shaft journalled in said bracket, a ear reduction unit interconnecting said rotary motor and said rock shaft, an energizing circuit for said motor including a reversing switch for controlling the direction of rotation of said motor and the direction of oscillation of said rock shaft, reversing switch actuating mechanism operable adjacent each end of a running stroke of said rock shaft for reversing the direction of rotation of said motor comprising a pair of superposed, rotatable cam members having aligned, elongate slots of unequal angular extent, an electromagnetically actuated latch interconnecting said cam members to enable conjoint angular movement of said cam members in one direction, and means driven by said gear reduction unit and extending into said slots for effecting conjoint angular movement of said cam members adjacent each stroke end of the running stroke for actuating said reversing switch, and means operable to release said latch to permit relative angular movement between said cam members in one direction so as to enable said motor to impart movement to said rock shaft beyond one end of the running stroke to a depressed park position prior to actuating said reversing switch to arrest rotation of said motor.

6. The unitized wiper actuating mechanism set forth in claim 5 wherein said gear reduction unit includes a pair of bevel gears, one of said bevel gears being attached to said rock shaft, and the other of said bevel gears being attached to a gear reduction shaft journalled in a sleeve bearing, and wherein said means driven by the gear reduction unit and extending into the slots of said cam members comprises a pin driven by the bevel gear attached to the gear reduction shaft.

7. The unitized wiper actuating mechanism set forth in claim 5 wherein said cam members are rotatably journalled on the periphery of said sleeve bearing, and wherein the slots in said cam members are concentric with said sleeve bearing.

8. The unitized wiper actuating mechanism set forth in claim 5 wherein said electromagnetically actuated length comprises a spring latch attached to one of said cam members and having an abutment engageable with superposed ends of said cam members, an armature of magnetic material attached to said spring latch, and an electromagnet for attracting said armature to engage said abutment with the superposed ends of said cam member.

9. The unitized wiper actuating mechanism set forth in claim 8 wherein said energizing circuit includes a manual switch for controlling energization of said electromagnet and conditioning said reversing switch to establish a dynamic braking circuit for said motor through said reversing switch upon movement of said rock shaft to its depressed park position.

References Cited

UNITED STATES PATENTS

| 2,861,457 | 11/1958 | Harrison | 318—443 X |
| 2,959,968 | 11/1960 | Gute et al. | 318—443 X |
| 2,985,024 | 5/1961 | Contant et al. | 318—443 X |

ORIS L. RADER, *Primary Examiner.*

J. J. BAKER, *Assistant Examiner.*